(12) United States Patent
Yang et al.

(10) Patent No.: US 11,294,383 B2
(45) Date of Patent: Apr. 5, 2022

(54) SELF-LEARNING ROBOT

(71) Applicant: LG ELECTRONICS INC., Seoul (KR)

(72) Inventors: Wonkeun Yang, Seoul (KR); Juhyeon Lee, Seoul (KR); Hoyoung Lee, Seoul (KR); Beomseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 648 days.

(21) Appl. No.: 16/325,134

(22) PCT Filed: Oct. 13, 2016

(86) PCT No.: PCT/KR2016/011446
§ 371 (c)(1),
(2) Date: Feb. 12, 2019

(87) PCT Pub. No.: WO2018/030577
PCT Pub. Date: Feb. 15, 2018

(65) Prior Publication Data
US 2021/0311480 A1 Oct. 7, 2021

(30) Foreign Application Priority Data

Aug. 12, 2016 (KR) .......... 10-2016-0103302

(51) Int. Cl.
*G05D 1/02* (2020.01)
*G06F 16/245* (2019.01)
(Continued)

(52) U.S. Cl.
CPC ....... *G05D 1/0214* (2013.01); *G05B 13/0265* (2013.01); *G05D 1/0221* (2013.01);
(Continued)

(58) Field of Classification Search
CPC .................................................. G05D 1/0214
See application file for complete search history.

(56) References Cited

U.S. PATENT DOCUMENTS 6,718,232 B2 * 4/2004 Fujita ..................... B25J 9/1602
700/245
6,859,682 B2 * 2/2005 Naka .................... G05D 1/0225
318/568.11
(Continued)

FOREIGN PATENT DOCUMENTS

CN    105404895 A  *  3/2016
CN    107666464 A  *  2/2018
(Continued)

OTHER PUBLICATIONS

PCT International Application No. PCT/KR2016/011446, International Search Report dated Apr. 20, 2017, 44 pages.
(Continued)

*Primary Examiner* — Alex C Dunn
(74) *Attorney, Agent, or Firm* — Lee, Hong, Degerman, Kang & Waimey PC

(57) ABSTRACT

A self-learning robot, according to one embodiment of the present invention, comprises: a data receiving unit for sensing video data or audio data relating to an object located within a predetermined range; a data recognition unit for matching data received from the data receiving unit and data included in a database in the self-learning robot; a result output unit for outputting a matching result from the data recognition unit; a recognition result verifying unit for determining the accuracy of the matching result; a server communication unit for transmitting data received from the data receiving unit to a server, when the accuracy of the matching result determined by the recognition result verifying unit is lower than a predetermined level; and an action command unit for causing the self-learning robot to perform
(Continued)

a pre-set object response action, when the accuracy of the matching result determined by the recognition result verifying unit is at least the predetermined level.

12 Claims, 18 Drawing Sheets

(51) Int. Cl.
    *G06F 16/23* (2019.01)
    *G05B 13/02* (2006.01)
    *G10L 15/22* (2006.01)
(52) U.S. Cl.
    CPC ............ *G06F 16/23* (2019.01); *G06F 16/245* (2019.01); *G05D 2201/0203* (2013.01); *G10L 15/22* (2013.01)

(56) References Cited

U.S. PATENT DOCUMENTS

| | | | | |
|---|---|---|---|---|
| 7,099,742 | B2 * | 8/2006 | Tajima | G06N 3/008 |
| | | | | 700/245 |
| 7,103,447 | B2 * | 9/2006 | Di Profio | G06N 3/008 |
| | | | | 318/800 |
| 7,152,050 | B2 | 12/2006 | Aoyama et al. | |
| 8,311,672 | B2 * | 11/2012 | Chou | G06N 3/008 |
| | | | | 700/245 |
| 10,073,531 | B2 * | 9/2018 | Hesch | G01P 15/093 |
| 10,303,703 | B2 * | 5/2019 | Meierhoefer | G06F 16/284 |
| 10,579,109 | B2 * | 3/2020 | Kim | G06F 3/04845 |
| 11,106,769 | B2 * | 8/2021 | Ohtani | G06F 21/316 |
| 11,162,800 | B1 * | 11/2021 | Carbery | G01C 21/3492 |
| 2005/0197739 | A1 * | 9/2005 | Noda | B25J 11/001 |
| | | | | 700/245 |
| 2005/0240412 | A1 * | 10/2005 | Fujita | G10L 15/16 |
| | | | | 704/270 |
| 2006/0112031 | A1 | 5/2006 | Ma et al. | |
| 2014/0199663 | A1 * | 7/2014 | Sadeh-Koniecpol | |
| | | | | H04L 63/145 |
| | | | | 434/118 |
| 2016/0180239 | A1 | 6/2016 | Frankel et al. | |
| 2017/0235848 | A1 * | 8/2017 | Van Dusen | G06F 30/20 |
| | | | | 705/12 |

FOREIGN PATENT DOCUMENTS

| | | |
|---|---|---|
| JP | 3854061 B2 * | 12/2006 |
| JP | 2012139798 | 7/2012 |
| KR | 20030019125 | 3/2003 |
| KR | 101055282 | 8/2011 |

OTHER PUBLICATIONS

Korean Intellectual Property Office Application Serial No. 10-2018-0119624, Office Action dated Oct. 8, 2018, 52 pages.

\* cited by examiner

SELF-LEARNING ROBOT

This application is the National Stage filing under 35 U.S.C. 371 of International Application No. PCT/KR2016/011446, filed on Oct. 13, 2016, which claims the benefit of earlier filing date and right of priority to Korean Application No. 10-2016-0103302, filed on Aug. 12, 2016, the contents of which are all incorporated by reference herein in their entireties.

TECHNICAL FIELD

The present invention relates to a self-learning robot, and more particularly, to a robot for recognizing video data or audio data of a previously unrecognized object and self-learning or receiving information on the object or a system therefor.

BACKGROUND ART

Intelligent robots provide various services to humans in the home, organically combine with the social network of the information age, and function as a human-friendly remotely-controllable interface with home appliances. Combining such future computing environment with the intelligent service robots will lead to future robots based on cognitive, emotional and ubiquitous environments. Such robots organically operate in environments in our future life and grow with a continuous relationship through natural interaction with humans, thereby acting as human companions.

In general, robots have been developed for industrial use and have been used for factory automation. In recent years, as fields using robots have increased, medical robots, aerospace robots, etc. have been developed, and household robots used in the home have been made.

A representative example of a household robot includes a robot cleaner, which is a home appliance for sucking in dust or foreign materials to perform cleaning while autonomously traveling in a certain area. Such a robot cleaner generally includes a rechargeable battery and an obstacle sensor capable of avoiding an obstacle while traveling, thereby performing cleaning while autonomously traveling.

However, when the household robot cannot perform accurate behavior corresponding to an obstacle after recognizing the obstacle, unexpected damage may occur. Accordingly, there is a need for a system for autonomously updating information on an object and performing accurate behavior when there is no user at home.

DISCLOSURE

Technical Problem

An object of the present invention is to prevent a robot moving in a certain area from malfunctioning when a new object is found.

Another object of the present invention is to enable a robot to autonomously determine what the object is before performing subsequent behavior when a new object is found and to perform appropriate behavior.

Another object of the present invention is to solve a problem, which a robot has encountered, through communication between the robot and a digital device of a user.

Technical Solution

According to an embodiment of the present invention, a self-learning robot includes a data reception unit configured to sense video data or audio data related to an object located within a predetermined range, a data recognition unit configured to match data received from the data reception unit to data included in a database in the self-learning robot, a result output unit configured to output a matching result of the data recognition unit; a recognition result verification unit configured to determine accuracy of the matching result, a server communication unit configured to transmit the data received from the data reception unit to a server, when the accuracy of the matching result is less than a predetermined level as a result of determination of the recognition result verification unit, and a behavior instruction unit configured to allow the self-learning robot to perform a preset object-coping behavior, when the accuracy of the matching result is equal to or greater than the predetermined level as a result of determination of the recognition result verification unit.

The self-learning robot may further include a three-dimensional camera configured to sense a 3D shape of an object, and a microphone configured to sense audio having a predetermined level or more, and the data reception unit may receive video data and audio data from the 3D camera and the microphone.

The self-learning robot may further include a communication unit configured to transmit the matching result to a user equipment and to receive a control signal from the user equipment.

The matching result may include a first object-coping behavior of the self-learning robot corresponding to the object.

When the control signal instructs the first object-coping behavior of the self-learning robot included in the matching result, the recognition result verification unit may determine that the accuracy of the matching result is equal to or greater than the predetermined level.

When the control signal instructs a second object-coping behavior of the self-learning robot, which is not included in the matching result, the recognition result verification unit may determine that the accuracy of the matching result is less than the predetermined level.

The matching result may include an object-coping behavior of the self-learning robot corresponding to the object, and, when the matching result includes a plurality of object-coping behaviors of the self-learning robot corresponding to the object, the recognition result verification unit may determine that that the accuracy of the matching result is less than the predetermined level.

The self-learning robot may further include a recognition model updating unit configured to update the data in the database, and, when a re-matching result of the object is received from the server communication unit, the recognition model updating unit may update the database using the re-matching result.

The self-learning robot may further include a communication unit configured to transmit the re-matching result to a user equipment when a plurality of re-matching results is received from the server communication unit, and, when a signal for selecting a specific re-matching result from among the plurality of re-matching results is received from a user, the recognition model updating unit may update the database using the selected re-matching result.

When an object-coping behavior of the self-learning robot corresponding to the object is not output as the matching result, the recognition result verification unit may determine that the accuracy of the matching result is less than the predetermined level.

According to another embodiment of the present invention, a self-learning system of a robot includes a robot configured to recognize at least one object and to perform an object-coping behavior and a server configured to manage the object-coping behavior of the robot. The robot recognizes an object located within a predetermined range and transmits recognition data of the recognized object to the server when the object-coping behavior corresponding to the recognized object does not match, and the server analyzes the recognition data received from the robot and transmits object-coping behavior update data corresponding to the object to the robot.

A case when the object-coping behavior corresponding to the recognized object does not match may include a case when a plurality of object-coping behaviors with respect to one object are output.

A case when the object-coping behavior corresponding to the recognized object does not match may include a case a user inputs negative feedback to the robot with respect to the object-coping behavior output from the robot.

The server may generate object-coping behavior update data corresponding to the same object when recognition data having a predetermined capacity or more of the same object is received from a plurality of robots.

When object-coping behavior update data is received from the server, the robot may map the object-coping behavior included in the object-coping behavior update data to the object and store the mapped information in a database.

Advantageous Effects

The present invention has the following effects.

According to one embodiment of the present invention, it is possible to construct a system for enabling a robot moving within a certain area to learn a newly recognized object by itself to prevent malfunction when a new object is found.

According to another embodiment of the present invention, a robot can communicate with a server without user input to update learning of and object-coping behavior corresponding to an object by itself.

According to another embodiment of the present invention, when negative feedback is received from a user a predetermined number of times or more, object-coping behavior is updated through communication with the user such that a robot performs appropriate behavior corresponding to the object.

BEST MODE

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

Figure 1:
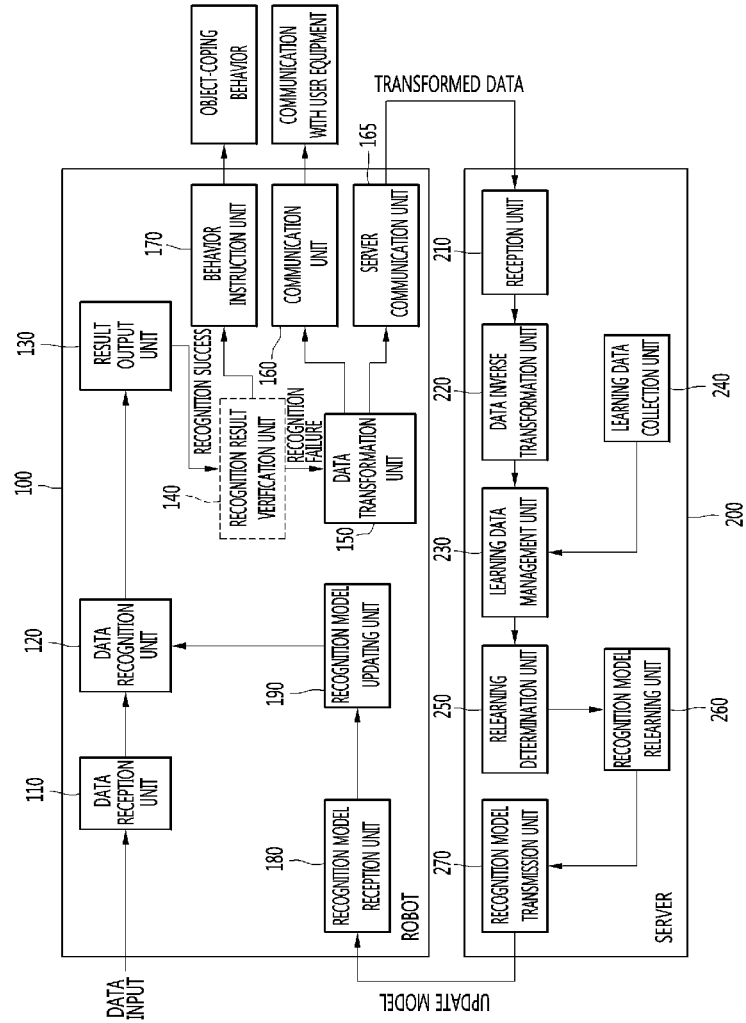
FIG. 1 is a block diagram illustrating a self-learning system of a robot according to an embodiment of the present invention.

FIG. 1 is a block diagram illustrating a self-learning system of a robot according to an embodiment of the present invention.

As shown in FIG. 1, the self-learning robot 100 may communicate with a user equipment or a server 200, for self-learning.

The self-learning robot 100 according to the embodiment of the present invention may include a data reception unit 110, a data recognition unit 120, a result output unit 130, a recognition result verification unit 140, a data transformation unit 150, a communication unit 160, a server communication unit 165, a behavior instruction unit 170, a recognition model reception unit 180 and a recognition model updating unit 190. In addition, the server 200 communicating with the self-learning robot 100 may include a reception unit 210, a data inverse transformation unit 220, a learning data management unit 230, a learning data collection unit 240, a relearning determination unit 250, a recognition model relearning unit 260 and a recognition model transmission unit 270. Even if some of the modules shown in FIG. 1 may be omitted or an additional module is added, a person who uses the self-learning robot 100 and the server 200 may implement a self-learning robot system and thus the present invention is not limited to the modules shown in FIG. 1.

The self-learning robot 100 may recognize at least one object while moving within a certain area. The self-learning robot 100 may include a three-dimensional (3D) camera for sensing the 3D shape of an object or a microphone for sensing audio having a predetermined level or more. The self-learning robot 100 may recognize the object through the 3D camera or the microphone. Hereinafter, assume that the object is recognized using video data such as an image of the appearance of the object captured using the camera.

The data reception unit 110 of the self-learning robot 100 may receive video data sensed by the 3D camera or audio data sensed by the microphone. In addition, the data recognition unit 120 of the self-learning robot 100 may match the data received from the data reception unit 110 to data included in a database in the self-learning robot 100. In the database (not shown) of the self-learning robot 100, the video data or the audio data of a plurality of objects and one or more pieces of object-coping behavior information mapped to the objects may be stored.

The result output unit 130 of the self-learning robot 100 may output the matching result of the data recognition unit 120. The result output unit 130 may output whether object information matching the object and mapped object-coping behavior information are present as the matching result of the data recognition unit.

The recognition result verification unit 140 of the self-learning robot 100 may determine accuracy of the matching result based on the matching result received from the result output unit 130. First, the recognition result verification unit 140 of the self-learning robot 100 may set a criterion for determining whether recognition of the data recognition unit 120 has succeeded or failed. For example, the self-learning robot 100 may determine that recognition of a specific object has failed, when the self-learning robot 100 receives, from the user, a command for performing a second object-coping behavior with respect to the specific object instead of a first object-coping behavior a predetermined number of times after the specific object is recognized and the first object-coping behavior is performed. In addition, when the first object-coping behavior is mapped to the specific object in the database of the self-learning robot 100 but the second object-coping behavior is actually performed, since the first object-coping behavior and the second object-coping behavior are different, the recognition result verification unit 140 may determine that recognition has failed. In addition, when the self-learning robot 100 recognizes a specific object and then outputs a plurality of object-coping behaviors, the recognition result verification unit 140 may determine that recognition has failed. In addition, if a plurality of self-learning robots is located within a certain area and the self-learning robots output different object-coping behaviors when recognizing the same object, the recognition result verification unit 140 may determine that recognition has failed. In addition, the recognition result verification unit 140 of the self-learning robot 100 may output accuracy of the matching result as a numerical value. For example, the recognition result verification unit 140 may determine that recognition has succeeded if accuracy of the matching result is equal to or greater than 80%. Alternatively, the recognition result verification unit 140 may determine that recognition has succeeded if accuracy of the matching result is equal to or greater than an accuracy value set by the user.

When the recognition result verification unit 140 of the self-learning robot 100 determines that the accuracy of the matching result is equal to or greater than a predetermined level, the behavior instruction unit 170 may enable the self-learning robot 100 to perform a preset object-coping behavior mapped to the object.

In contrast, when the recognition result verification unit 140 of the self-learning robot 100 determines that the accuracy of the matching result is less than the predetermined level, data including the image of the object may be transmitted to the user equipment through the communication unit 160, thereby receiving a command for performing a specific object-coping behavior from the user.

In addition, when the accuracy of the matching result is less than a predetermined level as the result of determination of the recognition result verification unit 140 of the self-learning robot 100, communication with the server 200 may be performed through the server communication unit 165 and data may be received from the server to perform an appropriate object-coping behavior corresponding to the object without user input.

In this case, the data transformation unit 150 of the self-learning robot 100 may transform the data received by the data reception unit 110 into data to be transmitted to the user equipment or the server. The data transformation unit 150 may blur or crop a human face image in consideration of privacy invasion prevention and transmit the blurred or cropped image. In addition, the data transformation unit 150 may encrypt the data and transmit the encrypted data in order to prevent image leakage and hacking. In addition, the data transformation unit 150 may transmit information related to recognition failure including the environment in which the self-learning robot 100 recognizes an object, such as information on the distance from the object and temperature and position information of the object to the user equipment or the server. Accordingly, the data transformation unit 150 may transmit sensing video data or audio data, from which personal information has been deleted, data related to recognition failure, etc.

The server 200 for transmitting and receiving data to and from the self-learning robot 100 according to the embodiment of the present invention may include a reception unit 210 for receiving the transformed data or the processed data to the user equipment or the server.

As shown in FIG. 1, a data inverse transformation unit 220 of the server 200 may inversely transform the transformed data received by the reception unit 210.

The data transformed by the data inverse transformation unit 220 of the server 200 may be managed by a learning data management unit 230. Further, the learning data management unit 230 may collect recognition data of various objects from a plurality of self-learning robots. In addition, the learning data management unit 230 classify and manage the data received from the plurality of self-learning robots according to recognition data types or robot apparatuses.

The learning data collection unit 240 of the server 200 may extract a plurality of data similar to the object from another database, upon determining that it is difficult to determine object information only using the recognition data received from the plurality of self-learning robots. For example, the learning data collection unit may request data from another self-learning robot in which images similar to the object or other data are stored. In addition, the learning data collection unit may extract images similar to the object using the Internet. In addition, the learning data collection unit may access a predetermined database and extract images similar to the object therefrom.

The relearning determination unit 250 of the server 200 may determine whether the database of the self-learning robots is updated based on accumulated data collected from the plurality of self-learning robots. In this case, when the plural self-learning robots output the recognition failure results of the object within a predetermined time, the relearning determination unit 250 may determine that information on the object and data related to the object-coping behavior are updated with respect to all self-learning robots communicating with the server 200. In addition, when the collected recognition data is clustered and recognition failure data exceeding a predetermined capacity is accumulated in a specific cluster, the relearning determination unit 250 may determine that information on the object and data related to the object-coping behavior are updated with respect to all self-learning robots communicating with the server 200. In addition, when the same recognition failure result is continuously received from one self-learning robot 100, the relearning determination unit 250 may determine that information on the object and data related to the object-coping behavior are updated with respect to the corresponding self-learning robot 100.

Upon determining that the data of the self-learning robot 100 is updated by the relearning determination unit 250, the recognition model relearning unit 260 of the server 200 may generate and process the information on the object and the data related to the object-coping behavior, both of which will be updated.

The recognition model transmission unit 270 of the server 200 may transmit the data generated and processed by the recognition model relearning unit 260 to the self-learning robot 100.

The recognition model reception unit 180 of the self-learning robot 100 may receive the information on the object and the data related to the object-coping behavior from the recognition model transmission unit 270 of the server 200.

The recognition model updating unit 190 of the self-learning robot 100 may update the database of the self-learning robot 100 using the data received from the server 200.

In the design shown in FIG. 1, since the self-learning robot may perform an appropriate behavior corresponding to the object without user input, unexpected behavior of the self-learning robot may be prevented.

Figure 2:
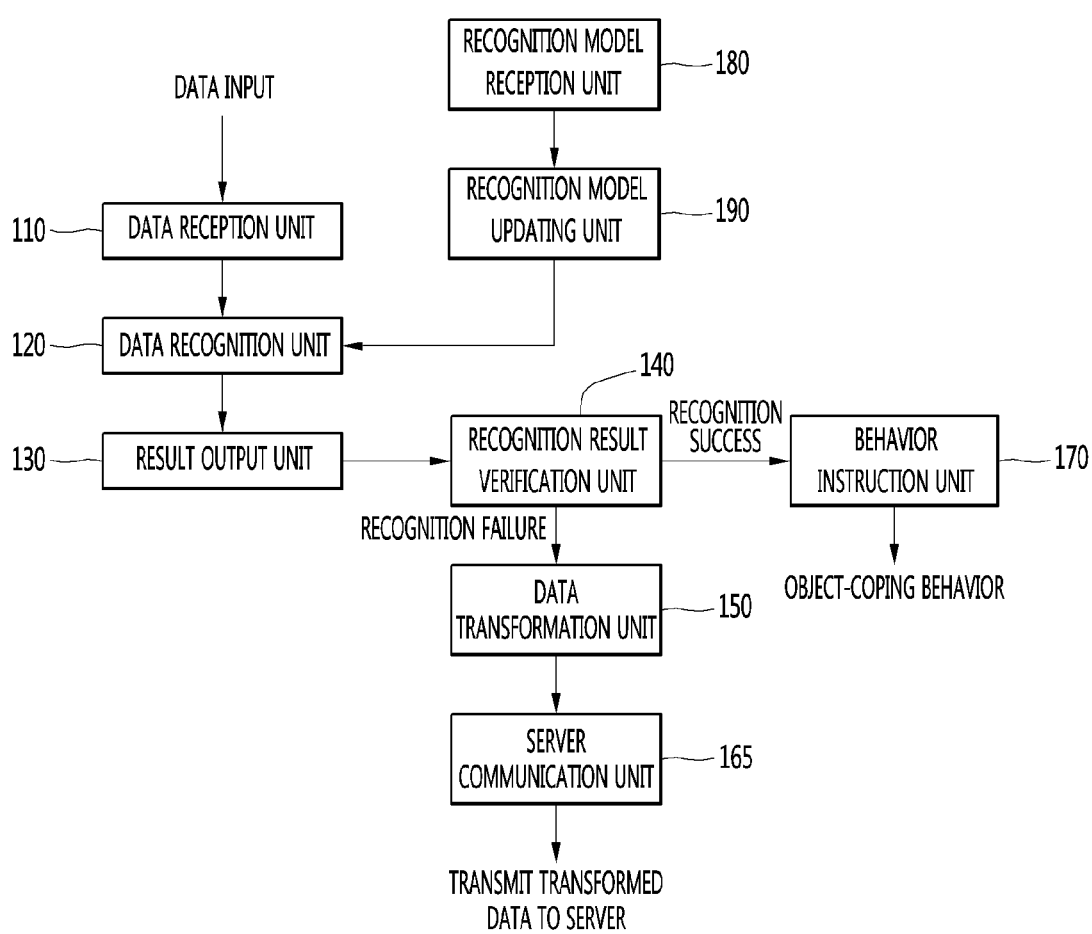
FIG. 2 is a diagram illustrating a self-learning method when a self-learning robot according to an embodiment of the present invention fails to recognize an object.

FIG. 2 is a diagram illustrating a self-learning method when a self-learning robot according to an embodiment of the present invention fails to recognize an object.

As shown in FIG. 2, the self-learning robot 100 according to the embodiment of the present invention may recognize a specific object and receive recognition data through the data reception unit 110. In addition, the data recognition unit 120 may match the data received from the data reception unit 110 to data included in the database in the self-learning robot 100. The result output unit 130 may output the matching result of the data recognition unit 120. In addition, the recognition result verification unit 140 may determine accuracy of the matching result of the result output unit 130. When the recognition result verification unit 140 determines that the accuracy of the matching result is equal to or greater than the predetermined level, the behavior instruction unit 170 may enable the self-learning robot to perform a predetermined object-coping behavior. In contrast, when the recognition result verification unit 140 determines that accuracy of the matching result is less than the predetermined level, the data transformation unit 150 transforms the recognition data according to a predetermined algorithm and the server communication unit 165 may transmit the transformed data to the server 200. The recognition model reception unit 180 of the self-learning robot 100 may receive the object information and the data on the object-coping behavior from the recognition model transmission unit 270 of the server 200. In addition, the recognition model updating unit 190 of the self-learning robot 100 may update the database of the self-learning robot 100 using the data received from the server 200.

Figure 3:
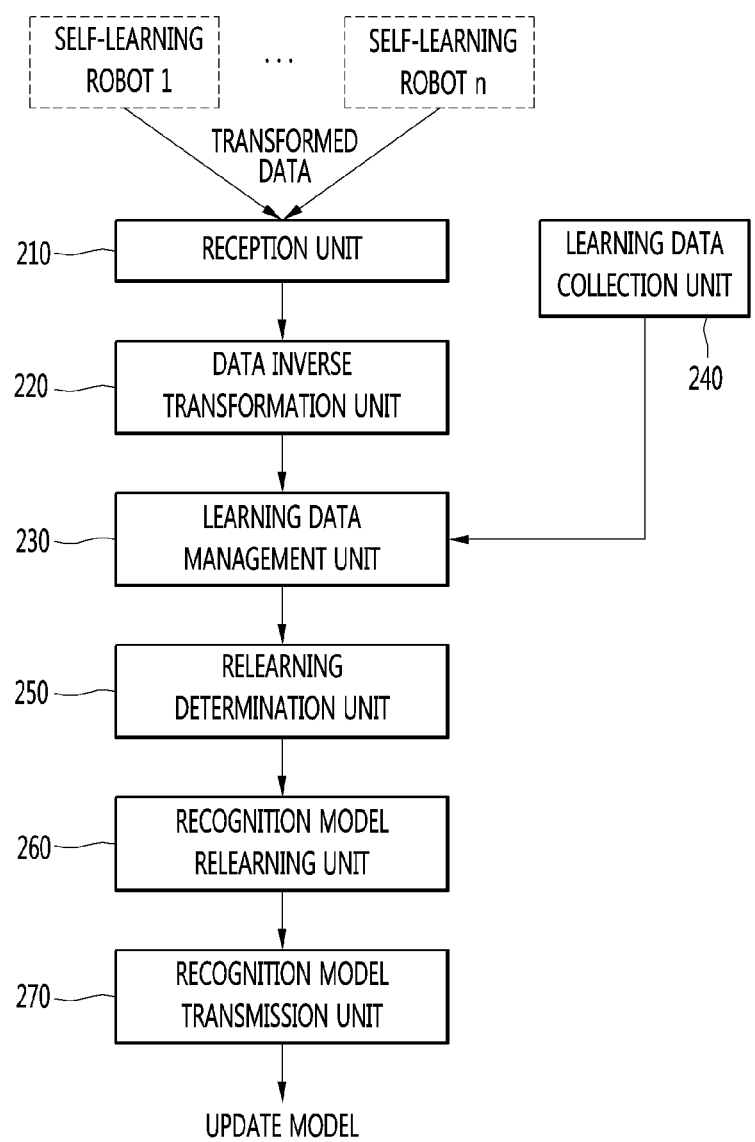
FIG. 3 is a diagram illustrating an example in which a server according to an embodiment of the present invention receives recognition failure data from a plurality of self-learning robots.

FIG. 3 is a diagram illustrating an example in which a server according to an embodiment of the present invention receives recognition failure data from a plurality of self-learning robots.

The reception unit 210 of the server 200 which transmits and receives data to and from the plurality of the self-learning robots 100 according to the embodiment of the present invention may receive transformed data or processed data. The data inverse transformation unit 220 of the server 200 may inversely transform the transformed data received by the reception unit 210. The data transformed by the data transformation unit 220 of the server 200 may be managed by the learning data management unit 230. In addition, the learning data collection unit 240 of the server 200 may extract a plurality of data similar to the object from another database, upon determining that it is difficult to determine object information only using the recognition data received from the plurality of self-learning robots. The relearning determination unit 250 of the server 200 may determine whether the database of the self-learning robots is updated based on accumulated data collected from the plurality of self-learning robots. In this case, when the plural self-learning robots output the recognition failure results of the object within a predetermined time, the relearning determination unit 250 may determine that information on the object and data related to the object-coping behavior are updated with respect to all self-learning robots communicating with the server 200. In addition, when the collected recognition data is clustered and recognition failure data exceeding a predetermined capacity is accumulated in a specific cluster, the relearning determination unit 250 may determine that information on the object and data related to the object-coping behavior are updated with respect to all self-learning robots communicating with the server 200. In addition, when the same recognition failure result is continuously received from one self-learning robot 100, the relearning determination unit 250 may determine that information on the object and data related to the object-coping behavior are updated with respect to the corresponding self-learning robot 100. Upon determining that the data of the self-learning robot 100 is updated by the relearning determination unit 250, the recognition model relearning unit 260 of the server 200 may generate and process the information on the object and the data related to the object-coping behavior, both of which will be updated. The recognition model transmission unit 270 of the server 200 may transmit the data generated and processed by the recognition model relearning unit 260 to the self-learning robot 100.

Figure 4:
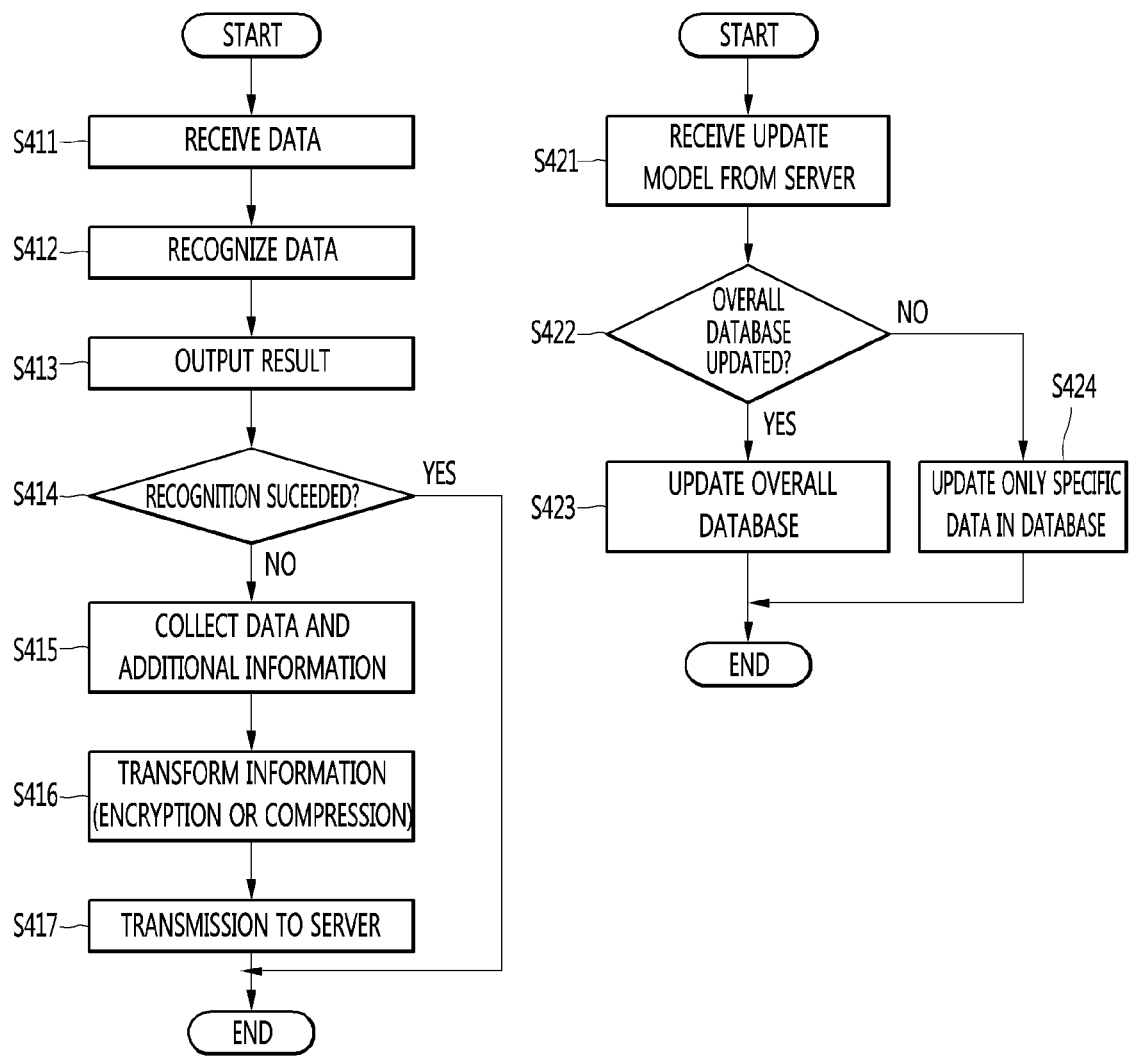
FIG. 4 is a view illustrating a method of performing self-learning of a robot by a transmission unit and a reception unit of a self-learning robot according to an embodiment of the present invention.

FIG. 4 is a view illustrating a method of performing self-learning of a robot by a transmission unit and a reception unit of a self-learning robot according to an embodiment of the present invention.

As shown in FIG. 4, the self-learning robot 100 according to the embodiment of the present invention may include a transmission unit and a reception unit. The transmission unit may receive data on a specific object to be recognized by the self-learning robot 100 (S411) and recognize the received data (S412). In addition, a result of recognizing the received data may be output (S413), and whether the specific object is accurately recognized may be determined based on the output result (S414). Upon determining that recognition has succeeded, the function of the transmission unit may end. In contrast, upon determining that recognition has failed, collection of additional information of the specific object may be determined (S415). In addition, the recognized data may be transformed according to a predetermined algorithm (S416) and the transformed data may be transmitted to the server (S417).

The reception unit of the self-learning robot 100 according to the embodiment of the present invention may receive the update model from the server 200 (S421) and determine whether the overall database of the self-learning robot 100 is updated based on the update model (S422). According to the result of determination, the overall database of the self-learning robot 100 may be updated (S423) or only data portion related to the object in the database may be updated (S424).

Figure 5:
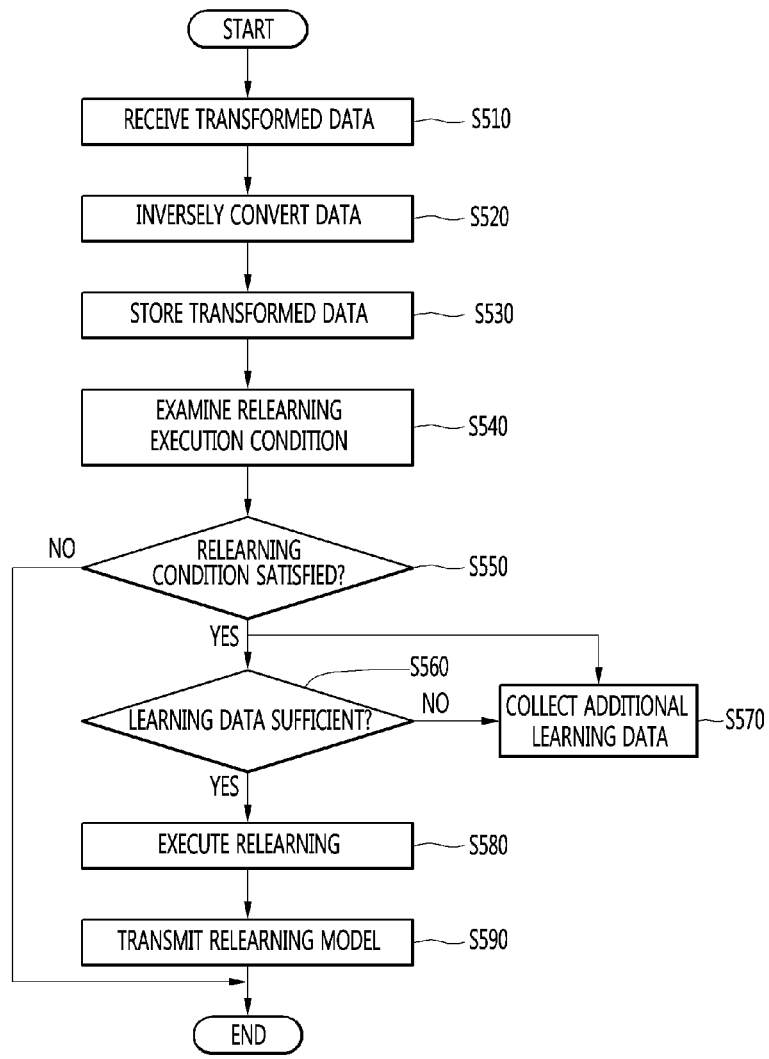
FIG. 5 is a view illustrating a method of training a self-learning robot at a server according to an embodiment of the present invention.

FIG. 5 is a view illustrating a method of training a self-learning robot at a server according to an embodiment of the present invention.

As shown in FIG. 5, the server 200 which performs communication with the self-learning robot 100 according to the embodiment of the present invention may receive the data transformed by the self-learning robot 100 (S510), inversely transform the transformed data (S520), store the inversely transformed data (S530), and determine the database update condition of the self-learning robot 100 (S540). In this case, whether the update condition is satisfied may be determined (S550), and, if update is necessary, whether data necessary to update the database is sufficient may be determined (S560). Upon determining that the data is sufficient, relearning data may be generated (S580) and the generated relearning data may be transmitted to the self-learning robot 100 (S590). In contrast, upon determining that the data is insufficient, additional data may be collected (S570).

Figure 6:
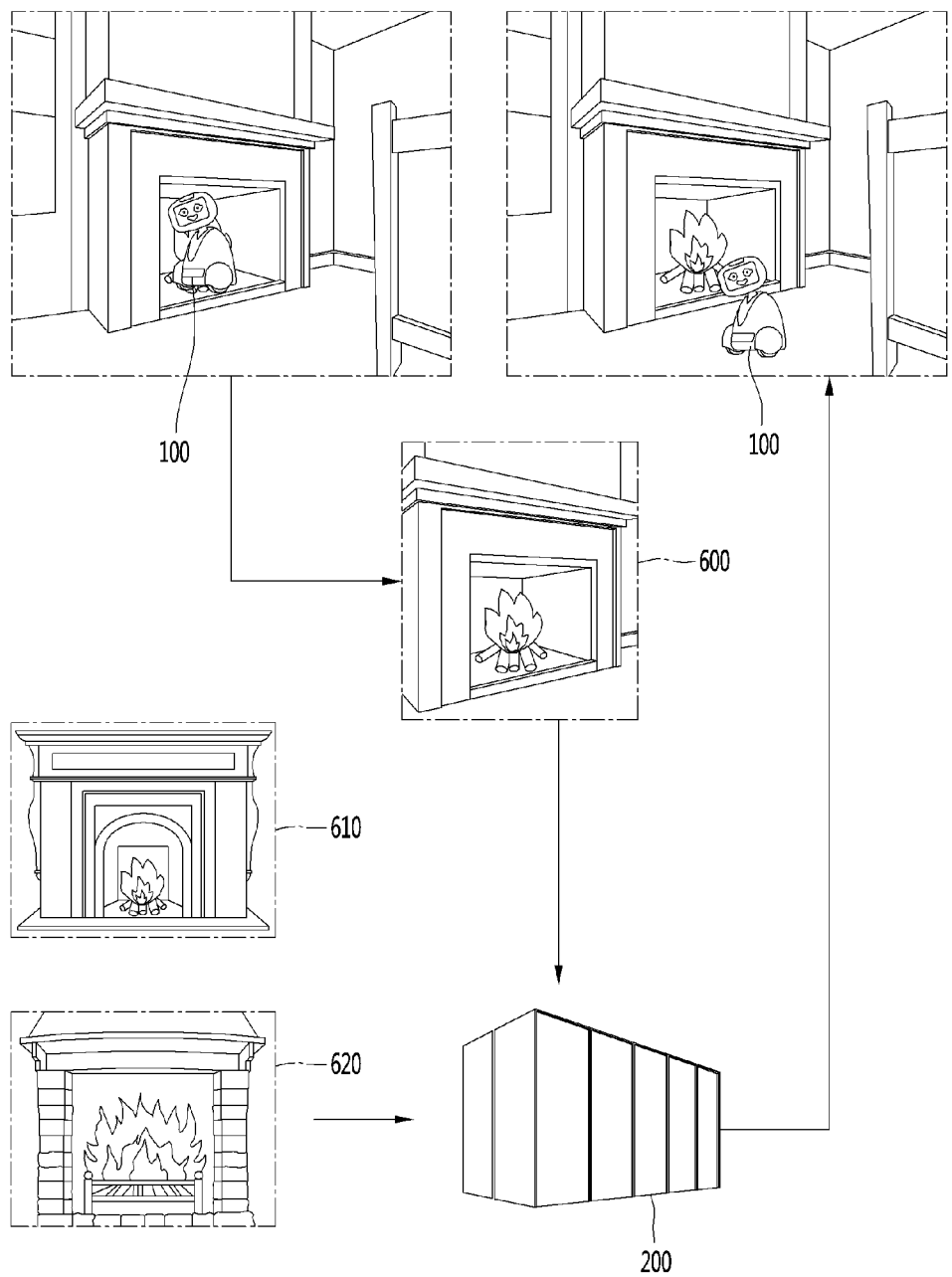
FIG. 6 is a view illustrating a first embodiment in which a self-learning robot according to an embodiment of the present invention updates a database after recognition failure.

FIG. 6 is a view illustrating a first embodiment in which a self-learning robot according to an embodiment of the present invention updates a database after recognition failure.

As shown in FIG. 6, the self-learning robot 100 may move within the home. At this time, if the self-learning robot 100 does not avoid but passes through a fireplace 600, recognition failure may be determined. Accordingly, the self-learning robot 100 may transmit the captured image of the fireplace 600 to the server 200 to request update of the database for self-learning. The server 200 may generate and transmit information on the fireplace 600 and data on an object-coping behavior corresponding to the fireplace 600 to the self-learning robot 100, upon determining that the database is able to be updated only using the image captured by the self-learning robot 100. In contrast, the server may extract similar images 610 and 620 and generate and transmit information on the fireplace 600 and data on an object-coping behavior corresponding to the fireplace 600 to the self-learning robot 100, upon determining that the database is not able to be updated only using the image captured by the self-learning robot 100. The object-coping behavior corresponding to the fireplace 600 may be avoidance or movement in another direction. Further, the self-learning robot 100, in which the database has been updated, may not pass through the fireplace 600 but avoid the fireplace or move in another direction.

Figure 7:
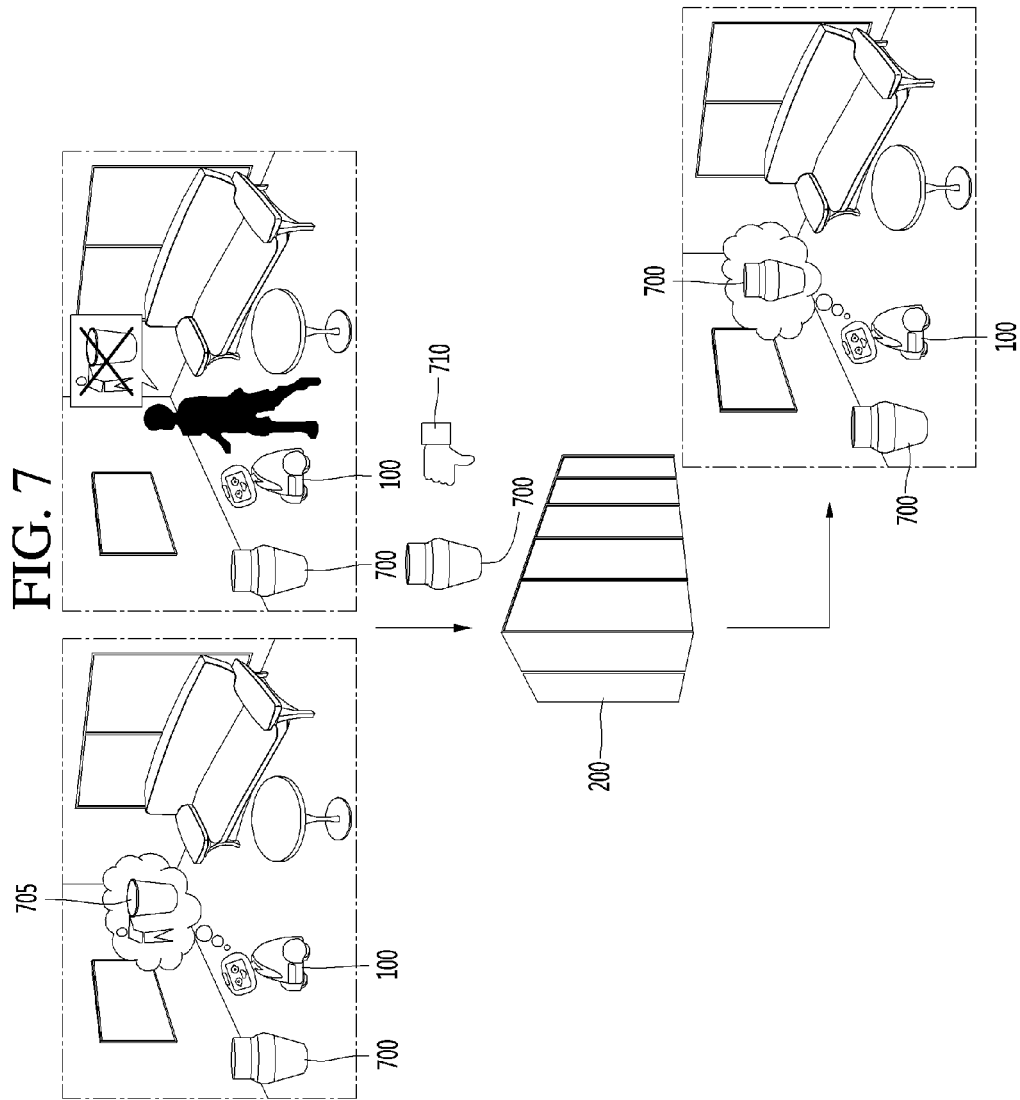
FIG. 7 is a view illustrating a second embodiment in which a self-learning robot according to an embodiment of the present invention updates a database after recognition failure.

FIG. 7 is a view illustrating a second embodiment in which a self-learning robot according to an embodiment of the present invention updates a database after recognition failure.

As shown in FIG. 7, the self-learning robot 100 may move within the home. At this time, the self-learning robot 100 may find a pottery 700, retrieve data having a similar image from the database, and recognize the pottery 700 as a trash can 705. Accordingly, the self-learning robot 100 may perform an object-coping behavior of collecting and putting the trash in the pottery 700. In this case, when a user inputs negative feedback 710 to the object-coping behavior of the self-learning robot 100, the self-learning robot 100 may define the behavior of putting the trash in the pottery as recognition failure. Accordingly, the self-learning robot 100 may transmit the captured image of the pottery 700 to the server 200 to request database update for self-learning. The server 200 may generate and transmit information on the pottery 700 and data on an object-coping behavior corresponding to the pottery 700 to the self-learning robot 100, upon determining that the database is able to be updated only using the image captured by the self-learning robot 100. In contrast, the server may extract similar images and generate and transmit information on the pottery 700 and data on an object-coping behavior corresponding to the pottery 700 to the self-learning robot 100, upon determining that the database is not able to be updated only using the image captured by the self-learning robot 100. Further, although not shown in FIG. 7, the user may directly upgrade the database of the self-learning robot 100. The object-coping behavior corresponding to the pottery 700 may be avoidance. Further, the self-learning robot 100, in which the database has been updated, may not put the trash in the pottery 700 but avoid the pottery.

Figure 8:
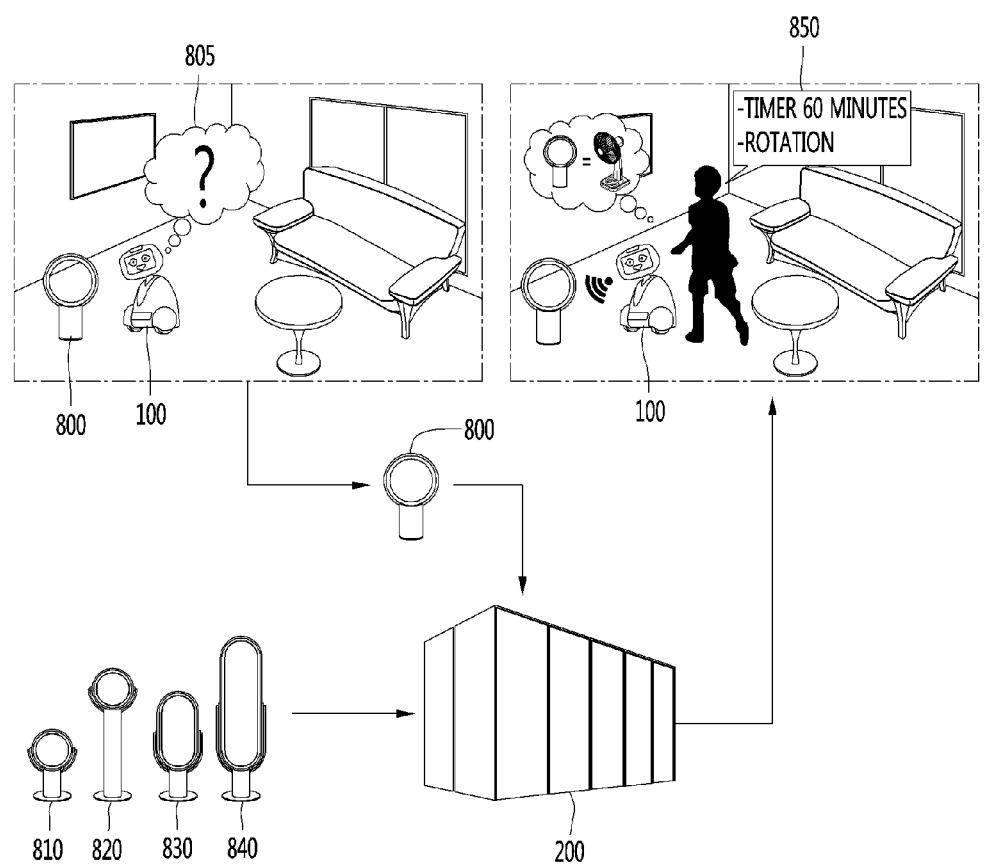
FIG. 8 is a view illustrating a third embodiment in which a self-learning robot according to an embodiment of the present invention updates a database after recognition failure.

FIG. 8 is a view illustrating a third embodiment in which a self-learning robot according to an embodiment of the present invention updates a database after recognition failure.

As shown in FIG. 8, the self-learning robot 100 may move within the home. At this time, when the self-learning robot 100 may find a fan 800 and may not retrieve a similar image thereof from the database, the self-learning robot 100 may not define the fan 800 as a specific object. The self-learning robot 100 may not perform an object-coping behavior if the specific object is not defined. In this case, the self-learning robot 100 may define the object-coping behavior, which has not been performed, as recognition failure. Accordingly, the self-learning robot 100 may transmit the captured image of the fan 800 to the server 200 to request database update for self-learning. The server 200 may generate and transmit information on the fan 800 and data on an object-coping behavior corresponding to the fan 800 to the self-learning robot 100, upon determining that the database is able to be updated only using the image captured by the self-learning robot 100. In contrast, the server may extract similar images 810, 820, 830 and 840 and generate and transmit information on the fan 800 and data on an object-coping behavior corresponding to the fan 800 to the self-learning robot 100, upon determining that the database is not able to be updated only using the image captured by the self-learning robot 100. The self-learning robot 100 in which the data base is updated may define the fan 800 as the same fan 800 as the similar images 810, 820, 830 and 840. In addition, the self-learning robot 100 may define the fan 800 and then perform an object-coping behavior of turning on/off the fan according to a command 850 of the user.

Figure 9:
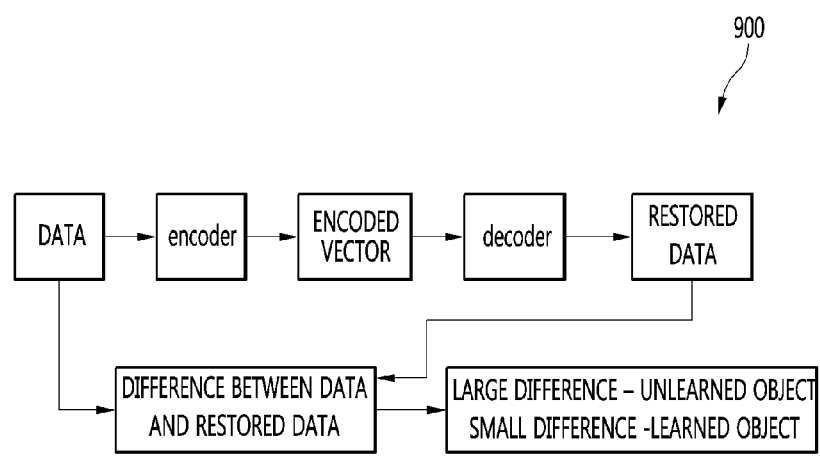
FIGS. 9 to 11 are views illustrating technologies used when the self-learning robot according to the embodiment of the present invention performs self-learning.
Figure 10:
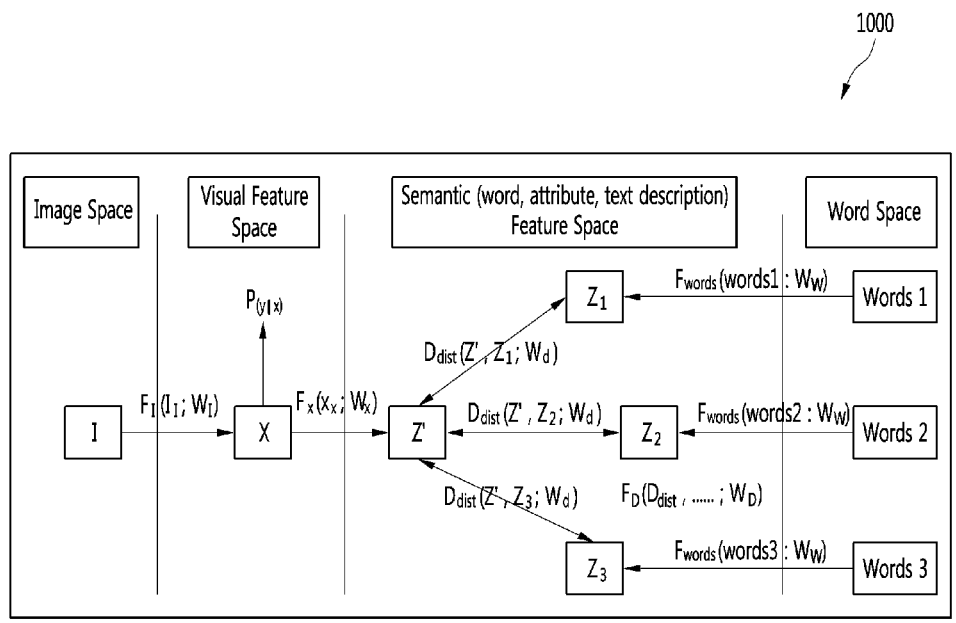
Figure 11:
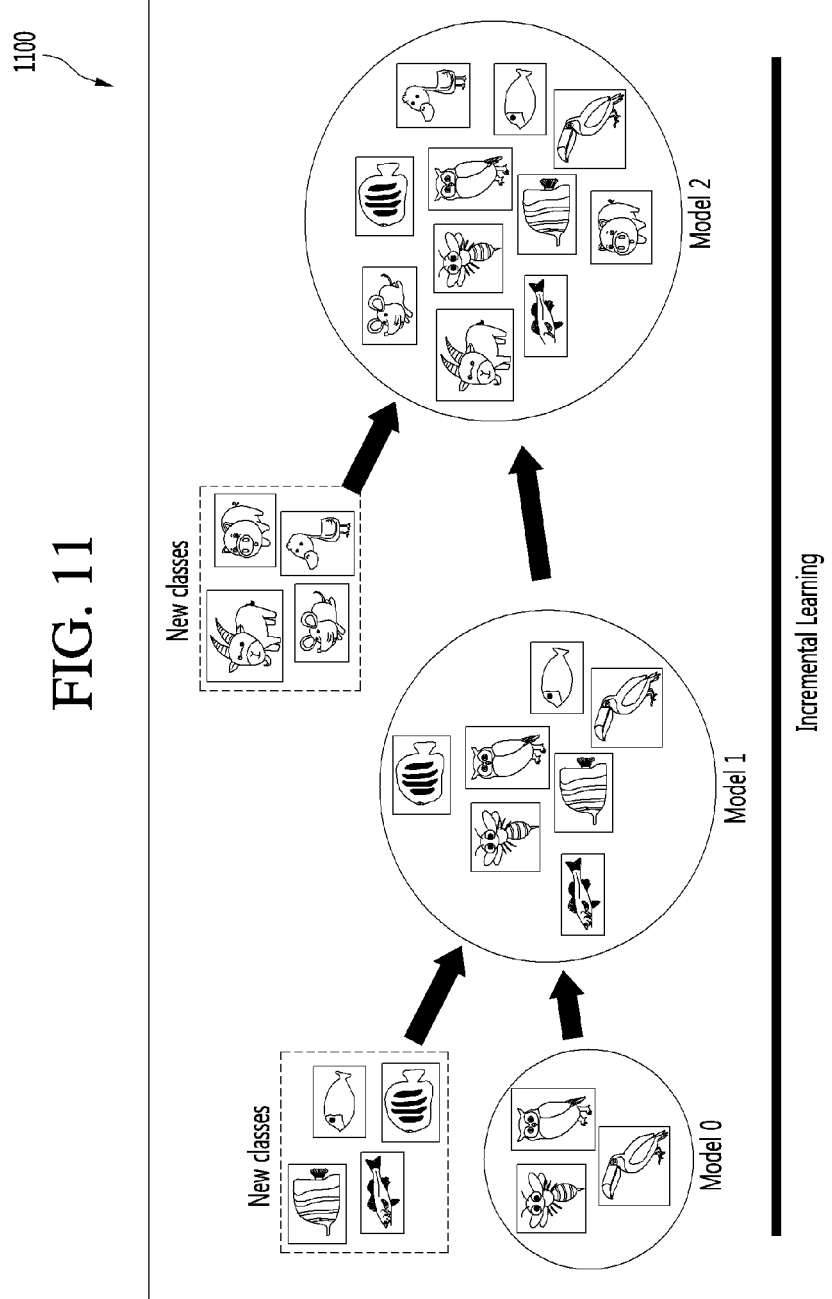

FIGS. 9 to 11 are views illustrating technologies used when the self-learning robot according to the embodiment of the present invention performs self-learning.

FIG. 9 is a view illustrating autoencoder 900 technology. The autoencoder 900 technology refers to technology for encoding data and decoding the data and uses a difference between data restored through encoding and decoding and original data. For example, when data on an already learned object is received, a difference between the restored data and the original data may be extremely small because the object is already learned. In contrast, when data on an object which is not learned is received, a difference between the restored data and the original data may be extremely large because the object is not learned and thus is not accurately restored. Accordingly, the self-learning robot 100 according to the embodiment of the present invention may determine whether the object is already learned based on the difference between the restored data and the original data.

FIG. 10 is a view illustrating zero shot learning 1000 technology. The self-learning robot 100 may define an object only through an image using the zero shot learning 1000 technology. That is, the self-learning robot 100 may determine whether the object is already learned only through the image using the zero shot learning 1000 technology. The zero shot learning 1000 technology mainly uses word information. That is, the image may be transformed into a visual feature value and the visual feature value is mapped to a semantic feature space. Accordingly, a semantic feature space may be made using a word, an image may be mapped in the semantic feature space, and a word corresponding to the image may be output depending on where the image is located in the semantic feature space.

FIG. 11 is a view illustrating an incremental learning 1100 technology. The self-learning robot 100 may not delete previously learned data when new data is received and may newly perform learning without accessing previously learned data. That is, the incremental learning 1100 technology refers to technology for cumulatively learning new data. Accordingly, the self-learning robot 100 may cumulatively add only data on a newly recognized object to the database while maintaining the previously learned data, using the incremental learning 1100 technology, thereby continuously increasing the amount of learning data.

Figure 12:
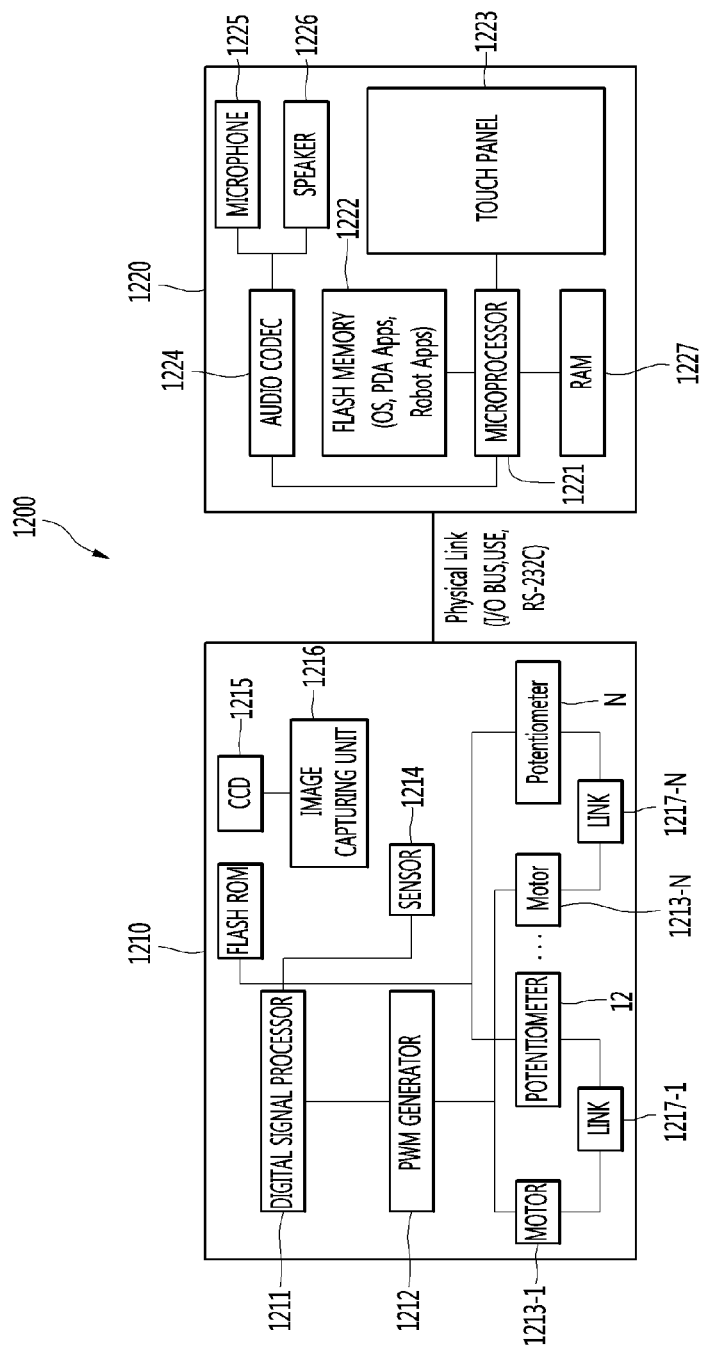
FIG. 12 is a block diagram showing the structure of a self-learning robot for learning a behavior according to another embodiment of the present invention.

FIG. 12 is a block diagram showing the structure of a self-learning robot for learning a behavior according to another embodiment of the present invention.

As shown in FIG. 12, the self-learning robot 1200 according to another embodiment of the present invention may include a motor controller 1210 for receiving a behavior pattern of another robot or a learning rule of a user through a wireless LAN, transmitting the behavior pattern of the other robot or the learning rule of the user to a motion controller through a physical link, and controlling driving of motors 1213-1 to 1213-N according to a command signal of the motion controller 1220, and the motion controller 1220 for receiving the behavior pattern of the other robot or the learning rule of the user from the motor controller 1210, determining a motion pattern of the robot through an external stimulus received through a touch panel and a microphone, and transmitting the command signal to the motor controller 1210.

The motor controller 1210 may include a wireless LAN (not shown) for receiving behavior patterns of other robots or user's instructions, a sensor 1214 for sensing external stimuli, an image capturing unit 1216 for capturing an external image through a CCD 1215, a digital signal processor 1211 for receiving and transmitting the stimuli of the sensor 1214 and the images of the image capturing unit 1216 to the motion controller 1220 through the physical link, digitally processing a command signal of a specific behavior received from the motion transmission unit 1220 and outputting a motor driving control signal, a PWM generator 1212 for receiving the motor driving control signal of the digital signal processor 1211, outputting a pulse width modulation signal for generating an operation speed corresponding to the motor driving control signal, and outputting a position signal indicating the position of a specific operation corresponding to the motor driving control signal, a plurality of motors 1213-1 to 1213-N for operating links according to the pulse width modulation signal and position signal of the PWM generator 1212, and a potentiometer for detecting the current position of a joint through a link, detecting an error in the operation according to the command, and re-controlling the detected error.

The motion controller 1220 may include an audio codec 1224 for receiving a voice signal through the microphone 1225 and coding the voice signal, a flash memory 1222 for storing an operating program and an application program, a touch panel 1223 formed integrally with an LCD panel to receive external stimuli, a RAM 1227 for storing the voice signal and the external stimuli respectively received through the audio codec 1224 and the touch panel 1223, and a microprocessor 1221 for signal-processing the voice signal and the external stimuli respectively received through the audio codec 1224 and the touch panel 1223, determining the behavior of the robot, and transmitting the command signal related to the behavior of the robot to the motor controller 1210. The physical link may include an I/O bus, a USB or an RS232-C cable.

Figure 13:
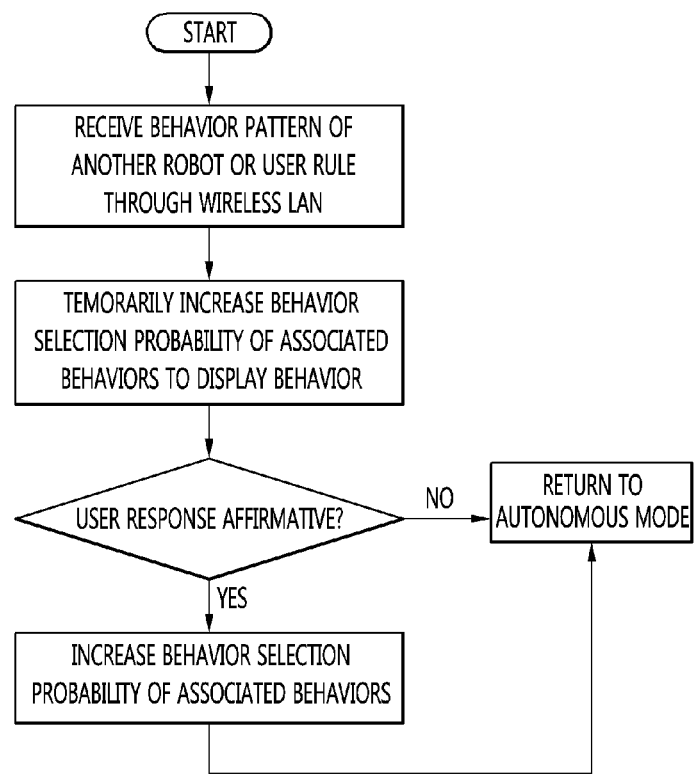
FIGS. 13 and 14 are views illustrating a behavior learning method of a self-learning robot according to another embodiment of the present invention.
Figure 14:
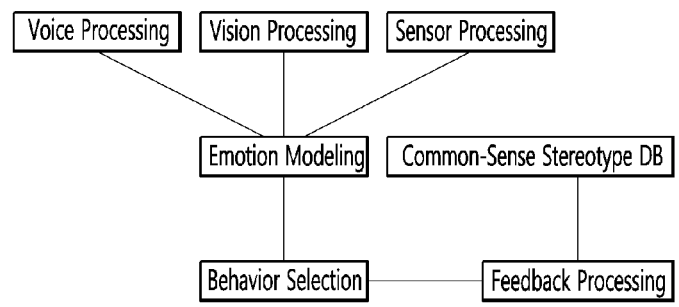

FIGS. 13 and 14 are views illustrating a behavior learning method of a self-learning robot according to another embodiment of the present invention.

As shown in FIG. 13, the behavior learning method of the self-learning robot 100 may include a first process of receiving the behavior pattern of another robot through a network, a second process of temporarily increasing a behavior selection probability of behaviors associated with the behavior pattern of the first process, a third process of determining whether a user's response is affirmative, and a fourth process of increasing the behavior selection probability of the behaviors to be associated upon determining that the user's response is affirmative in the third process.

For example, the robot may perform a behavior selection process of selecting a behavior according to an internal state, and the internal state may include emotion such as anger, joy and surprise and a motivation such as appetite and libido. The behavior selection process is aperiodically performed in a microprocessor and the selected behavior information of the robot is approximated by expressing the stopping posture of the robot at a specific time interval, which may have the same principle as movie and animation capable of implementing a moving image by continuously reproducing still images. As the movie is represented by image information, the stopping position of the robot indicates the current indication value of all joints of the robot, the current indication value of a rotation joint is an angle, and the current indication value of a direct-acting joint is displacement. At this time, the indication values of all joints indicating the stopping posture of the robot may be defined as a frame and frames created in time series may be defined as operation information. In operation of the present invention, first, the behaviors of the robot executable by a current mechanical device are analyzed and the connection ratios of the behaviors are predetermined, thereby implementing a common-sense stereotype DB. A specific item is modified in or added to the common-sense stereotype DB, in order to adjust the connection ratio between arbitrary behaviors. The common-sense stereotype DB is connected to a personal computer (PC) through a wireless LAN or an RS232C cable to replace content in order to allow the user to adjust the connection ratio between behaviors.

For example, the barking or digging behavior of the robot may be combined as a dog-like behavior or salutation or immobility may be combined as a soldier-like behavior. At this time, the robot may receive the behavior pattern of another robot through the network and increase the behavior selection probability of the behaviors associated with the behavior pattern, thereby expressing the behaviors. The robot may imitate the behavior pattern of another robot, by receiving the behavior pattern of another robot through the wireless LAN and adjusting the behavior selection probability of the robot. Then, the robot may determine whether the user affirmatively receives the behavior pattern of the other robot and determine the behavior pattern of the other robot as the behavior pattern thereof.

That is, when the user inputs feedback, whether the fed-back external input is praise or scolding of the user is determined to determine affirmation of the user. At this time, the user input through the touch sensor is determined as praise or scolding. It is possible to distinguish praise or scolding according to the position of the touch sensor touched by the user or a duration when the user presses the touchscreen.

As another method of determining praise or scolding, a word database for storing words corresponding to praise and scolding and user voice input may be compared to determine praise or scolding.

If the fed-back external input is praise or scolding of the user, the behavior selection probability may increase or decrease. That is, if the fed-back external input is the praise of the user, the current robot behavior may be recognized using the time-series data of the currently stored joint indication value and then the occurrence probability of the recognized robot behavior may be increased by a specific value, thereby learning the behavior pattern of another robot as the behavior pattern thereof. If the fed-back external input is the scolding of the user, the current robot behavior may be recognized using the time-series data of the currently stored joint indication value and then the occurrence probability of the recognized robot behavior may be decreased by a specific value. If the rules defined by the user are received through the wireless LAN, the behavior selection probability is adjusted using the above-described method to show the behavior according to the rules of the user and user satisfaction or dissatisfaction is recognized as praise or scolding, thereby determining whether to accept the behavior as the behavior pattern of the robot. If there are behaviors associated with the behavior pattern of another robot, the selection probability of the associated behaviors increases or decreases. The occurrence probability may increase in the case of the behavior associated with praise and decrease in the case of the behavior associated with scolding.

More specifically, referring to FIG. 14, the behavior selection process sets a probability of performing operations according to the state of the emotion modeling unit and determines operation to be performed according to the set probability. The emotion modeling unit may be continuously updated according to the external input and the behavior state of the robot. When the robot normally operates, when external stimulus is input through the touch sensor or the microphone, the external input may be stored in the RAM, and a feedback processor may determine whether the external input is the praise or scolding of the person. Upon determining that the external input is not the praise or scolding of the person, the external input stored in the RAM may not be used and the behavior selection process may be continuously performed. In contrast, upon determining that the external input is the praise or scolding of the person, the current behavior of the robot may be determined using the time-series data of the prestored joint indication value, the occurrence probability of the behavior may be increased or decreased by a specific value according to praise or scolding, and then the occurrence probability of the behavior may be stored.

Thereafter, the microprocessor determines whether there are behaviors associated with the behavior of the robot, which has received praise or scolding feedback, using the common-sense stereotype DB, increase or decrease and store the future occurrence probability of the behavior according to praise or scolding when there are associated behaviors, and then return to an autonomous mode in which the behavior selection process is continuously performed. Meanwhile, when the behavior pattern of another robot is received through the local LAN, the occurrence probability of the behavior may be arbitrarily adjusted. For example, assume that the current behavior pattern of the robot is a method of unconditionally avoiding an obstacle to the left and a behavior pattern newly received through the local LAN is a method of looking around and then moving to a side where an obstacle is not present between the left and the right. The robot may arbitrarily increase a probability of occurrence of a series of behaviors of determining an avoidance direction after looking around.

When the user praises a new method selected or executed by a higher probability, the probability of the method of looking around and selecting a direction when detecting an obstacle may be increased in the future. In addition, if the user defines and transmits a rule of rotating by 360 degrees and moving in a direction, in which an obstacle is not present, when detecting an obstacle using a PC, the behavior occurrence probability of the rule may be arbitrarily increased as described above to recognize the user response and then the subsequent probability of the behavior may be determined.

The self-learning robot may learn an object-coping behavior corresponding to a specific object using the behavior learning method described in FIGS. 12 and 14.

The self-learning robot described in FIGS. 15 to 21 is a robot cleaner as an example. Although a robot cleaner is described in FIGS. 15 to 21, the present invention is applicable to the other robot devices in addition to the robot cleaner.

Figure 15:
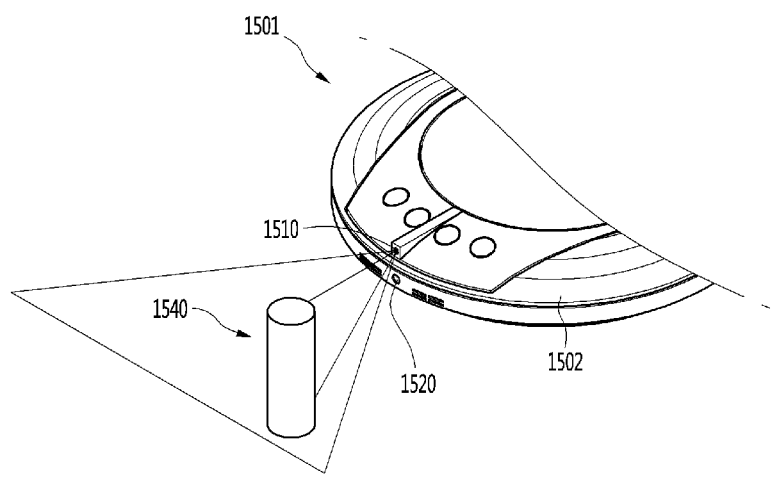
FIG. 15 is a perspective view showing a portion of a self-learning robot according to another embodiment of the present invention.
Figure 16:
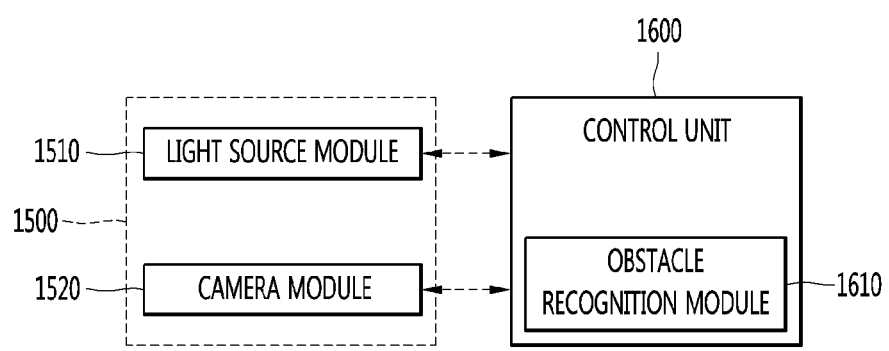
FIG. 16 is a block diagram schematically showing the configuration of a self-learning robot according to another embodiment of the present invention.

FIG. 15 is a perspective view showing a portion of a self-learning robot according to another embodiment of the present invention, and FIG. 16 is a block diagram schematically showing the configuration of a self-learning robot according to another embodiment of the present invention.

Referring to FIGS. 15 and 16, the self-learning robot 1501 according to another embodiment may include a main body 1502 forming appearance thereof, a light pattern sensor 1500 and a control unit 1600.

The light pattern sensor 1500 is provided on the front surface of the main body 1502 to emit a light pattern and to output a pattern image. As shown in FIG. 16, the light pattern sensor 1500 includes a light source module 1510 for emitting one or more cross-shaped light patterns to the front side of the main body 1502 and a camera module 1520 for capturing the pattern image of an area onto which the light patterns are irradiated. The light source module 1510 includes a laser diode (LD), a light emitting diode (LED), etc. The light pattern sensor may further include a separate lighting if necessary, in addition to the light source module 1510. The camera module 1520 may include one light pattern sensor or two or more light pattern sensors. The camera module 1520 is a structured light camera and the light pattern sensor includes a laser vision sensor. The light pattern sensor may further include a filter connected to the front end of the light source module to pass only a certain frequency of the light patterns emitted from the light source module.

The light pattern may be a combination of one or more cross-shaped light patterns and is preferably an asymmetric cross-shaped light pattern in which the length of a horizontal pattern is greater than that of a vertical pattern. That is, the light pattern sensor 1500 emits the asymmetric cross-shaped light pattern in which the length of the horizontal pattern is greater than that of the vertical pattern. The lengths of the vertical pattern and the horizontal pattern may be the same or the length of the vertical pattern may be greater than that of the horizontal pattern. However, since the horizontal pattern is set to scan an obstacle in a wide range, but the horizontal pattern is set to the extent necessary to move the mobile robot, the length of the horizontal pattern may be slightly less than that of the vertical direction. In addition, there are several combinations of vertical patterns and horizontal patterns and one horizontal pattern and a plurality of vertical patterns may be combined. Here, if the light pattern has a cone shape, a longest portion of each pattern, for example, the diameter of a circle or a major axis of an ellipse, may be the lengths of the horizontal pattern and the vertical pattern.

Referring to FIG. 16, the control unit 1600 may include an obstacle recognition module 1610 for processing the pattern image and recognizing the obstacle 1540. The obstacle recognition module 1610 may recognize presence/absence of an obstacle and the width of the obstacle using the pattern image of the horizontal pattern. For example, after the light patterns are continuously emitted while the mobile robot, the width of the obstacle may be recognized according to the time and degree of bending of the horizontal pattern. In addition, the obstacle recognition module 1610 may also recognize the height of the obstacle from the pattern image of the horizontal pattern. For example, after the position of the horizontal pattern in the pattern image in which an obstacle is not present is stored, the distance of the horizontal pattern moved by the obstacle may be calculated to recognize the height of the obstacle. If only the horizontal pattern is used, there is a limit to the recognizable height of the obstacle and there is a possibility of misrecognition. Accordingly, the obstacle recognition module 1610 may more accurately recognize the height of the obstacle using the vertical pattern or the vertical pattern and the horizontal pattern.

Figure 17:
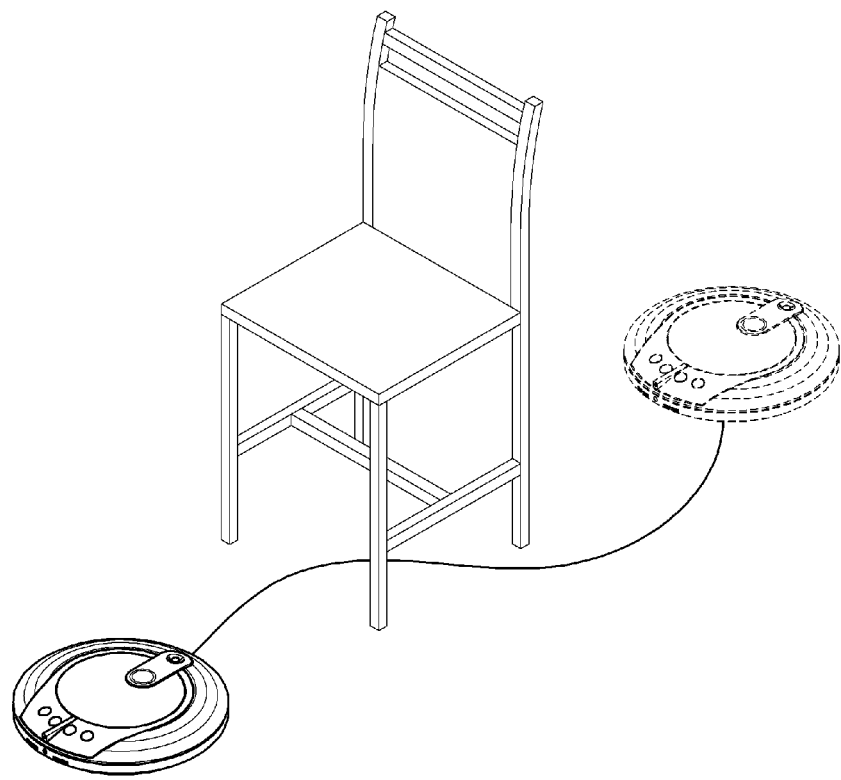
FIGS. 17 to 19 are views illustrating operation performed according to the obstacle detection result of a self-learning robot according to another embodiment of the present invention.
Figure 18:
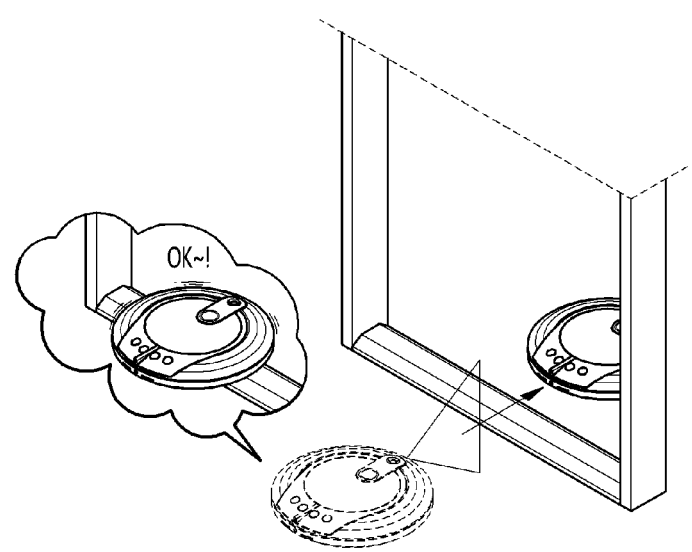
Figure 19:
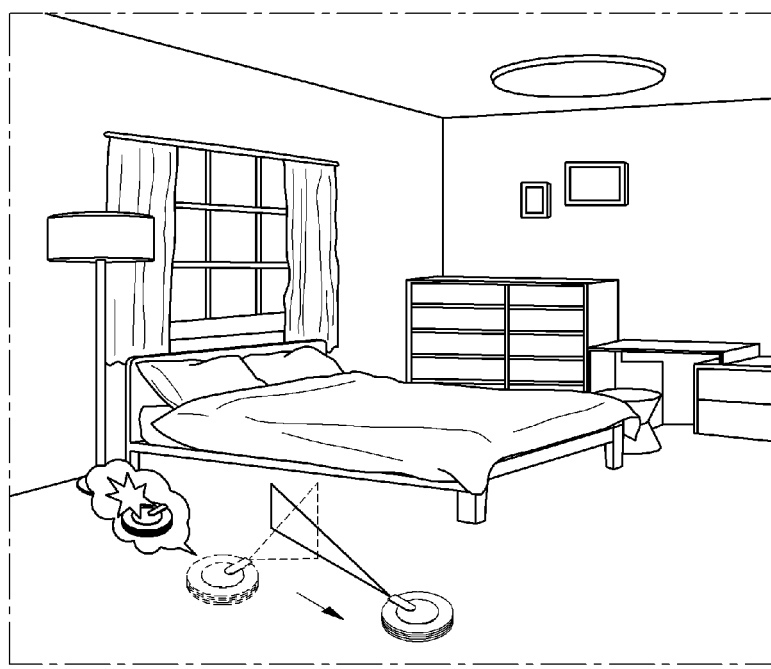

FIGS. 17 to 19 are views illustrating operation performed according to the obstacle detection result of a self-learning robot according to another embodiment of the present invention.

FIG. 17 shows the case where an obstacle is a chair having legs having a certain height or more. The self-learning robot may move between the legs and move under the chair because the legs of the chair have the certain height. FIG. 18 shows the case where the obstacle is a low threshold. The self-learning robot may emit light patterns forward, recognize the threshold, and cross over the threshold upon determining that the self-learning robot is able to cross over the threshold as the result of recognition. FIG. 19 shows the case where the obstacle is a bed frame. The self-learning robot may recognize the bed frame from the pattern image obtained by emitting the light patterns and move around the bed frame upon determining that the height of the bed frame is too low to pass as the result of recognition. Therefore, it is possible to prevent the self-learning robot from being trapped into an obstacle having a small gap, such as furniture such as bed or electronic products.

The self-learning robot may further include an image detection unit for capturing surroundings and outputting image information. The control unit 1600 may further include a position recognition module for recognizing the position of the self-learning robot using the image information output from the image detection unit. In addition, the control unit may further include a map generation module for generating a peripheral map using the recognized position.

Figure 20:
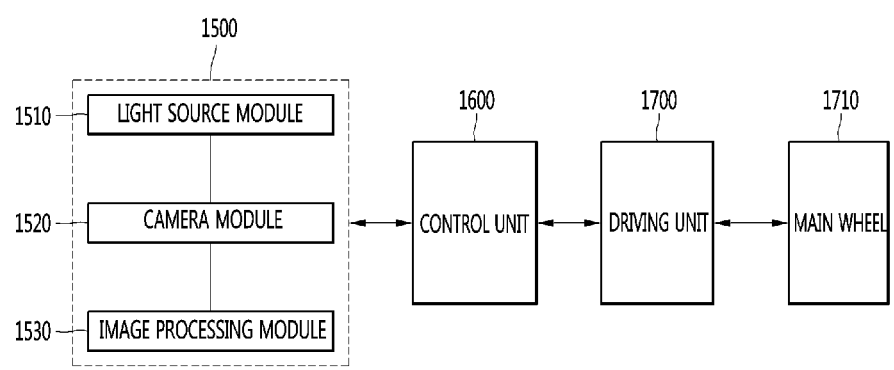
FIG. 20 is a block diagram schematically showing the other configuration of a self-learning robot according to another embodiment of the present invention.

FIG. 20 is a block diagram schematically showing the other configuration of a self-learning robot according to another embodiment of the present invention.

Referring to FIG. 20, the self-learning robot according to another embodiment may include a main body 1502 forming appearance thereof, a driving unit 1700, a light pattern sensor 1500 and a control unit 1600.

The light pattern sensor 1500 is provided on the front surface of the main body 1502 to emit one or more cross-shaped light pattern and to output a pattern image. Referring to FIG. 20, the light pattern sensor 1500 includes a light source module 1510 for emitting one or more cross-shaped light patterns to the front side of the main body 1502 and a camera module 1520 for capturing a pattern image of an area onto which the light patterns are irradiated. In addition, the light pattern sensor 1500 may further include an image processing module 1530 for processing the pattern image and detecting an obstacle. That is, although the obstacle recognition module may be included in the control unit, the image processing module capable of detecting the obstacle may be included in the light pattern sensor.

The light pattern may be a combination of one or more cross-shaped light patterns and is preferably an asymmetric cross-shaped light pattern in which the length of a horizontal pattern is greater than that of a vertical pattern. That is, the light pattern sensor 1500 emits the asymmetric cross-shaped light pattern in which the length of a horizontal pattern is greater than that of a vertical pattern. For the light source module 1510 and the camera module 1520, refer to the above description. The image processing module 1530 may process the image acquired by the camera module(s) to detect the obstacle. The image processing module 1530 may detect the obstacle from the image using the shape, area, change, etc. of the light pattern irradiated in the area. The image processing module 1530 may detect presence/absence of the obstacle and the size, width, height, etc. of the obstacle from the pattern image of the vertical pattern and the horizontal pattern. As another example, the image processing module may extract a pattern in a certain direction (e.g., an x direction), convert the pattern into another axis direction, and detect an obstacle using the converted pattern. If two camera modules are used, the image processing module may extract only a vertical component from an image captured by one camera module and only a horizontal component from an image captured by the other camera module. Then, the image processing module may generate a 3D pattern, detect an obstacle using the 3D pattern, and output obstacle information such as the size and shape of the obstacle to the control unit. The light pattern sensor may further include a filter connected to the front end of the light source module to pass only a certain frequency of the light patterns emitted from the light source module. The control unit 1600 recognizes the obstacle from the pattern image and generates a driving signal according to the result of recognition. The control unit 1600 may include an obstacle recognition module 1610 for processing the pattern image and recognizing the obstacle. Of course, the control unit 1600 may directly receive information on the detected obstacle from the image processing module 1530 and generate a driving signal. The mobile robot may further include an image detection unit for capturing surroundings and outputting image information. Here, the control unit 1600 may further include a position recognition module for recognizing the position of the mobile robot using the image information output from the image detection unit. The control unit may further include a map generation module for generating a peripheral map using the recognized position.

The driving unit 1700 may include a wheel motor for driving one or more wheels installed on the lower portion of the main body 1502 and move the main body according to a driving signal. The self-learning robot may include left and right main wheels 1710 on both lower sides thereof for movement thereof. Handles for facilitating user's gripping may be installed on both sides of the main wheel. The wheel motors are respectively connected to the main wheels to rotate the main wheels, and the wheel motors operate independently of each other and may rotate in both directions. In addition, the self-learning robot includes one or more auxiliary wheels on the rear surface thereof to support the main body, thereby minimizing friction between the lower surface of the main body and the floor and facilitating movement of the mobile robot.

Figure 21:
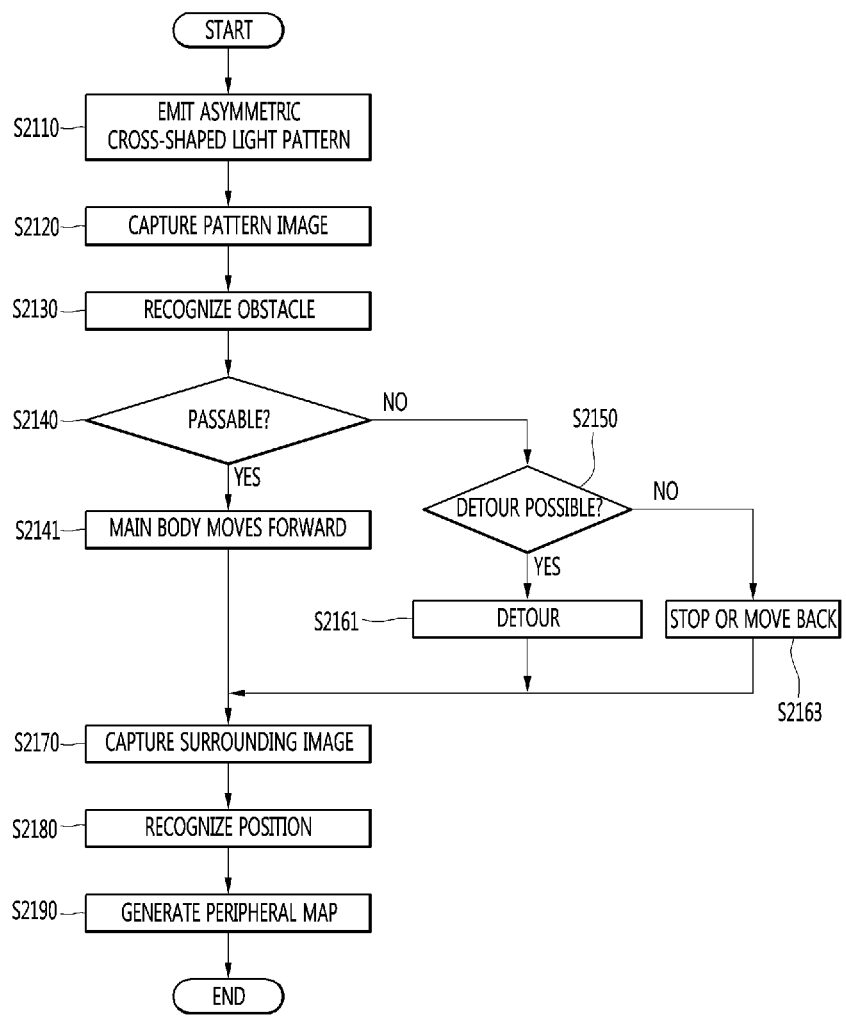
FIG. 21 is a flowchart schematically illustrating a method of controlling a self-learning robot according to another embodiment of the present invention.

FIG. 21 is a flowchart schematically illustrating a method of controlling a self-learning robot according to another embodiment of the present invention.

Referring to FIG. 21, the self-learning robot emits light patterns forward while moving or stopping (S2110). At this time, as described above, the light patterns are preferably asymmetric cross-shaped light patterns. Then, the self-learning robot captures and acquire the pattern image of the area in which the light patterns are irradiated (S2120). The self-learning robot recognizes an obstacle using the pattern image (S2130). At this time, the self-learning robot processes the pattern image through a control unit such as a microcomputer and recognizes the obstacle. Of course, the light pattern sensor may be designed to recognize the obstacle. For example, the self-learning robot may recognize presence/absence of the obstacle and the width and height of the obstacle using the horizontal pattern and accurately detect the height of the obstacle using the vertical pattern. The self-learning robot determines whether the robot is able to pass through the obstacle based on the result of recognizing the obstacle (S2140). As shown in FIG. 17, upon determining that the self-learning robot is able to pass through the obstacle, the main body of the self-learning robot moves forward and pass through the obstacle (S2141). As shown in FIG. 18, if there is a threshold, over which the robot is able to cross, the self-learning robot moves forward and crosses over the threshold. If the robot is not able to move forward, the self-learning robot determines whether the robot is able to move around the obstacle (S2150). As shown in FIG. 19, if a space is too small to pass through the obstacle, the self-learning robot moves around the obstacle (S2161). If the robot is not able to move forward or around, the self-learning robot may stop or move back (S2163). Such an algorithm may be changed according to the user or programing and a learning function may be added according to the specification of the self-learning robot. The self-learning robot may capture the surrounding image (S2170), and extract feature points from the surrounding image and recognize the position of the self-learning robot using the feature points (S2180). In addition, the self-learning robot may generate a peripheral map using the recognized position (S2190).

The above-described SELF-LEARNING ROBOT and system of SELF-LEARNING ROBOT are not limited to the application of the configurations and methods of the above-described embodiments and the entire or part of the embodiments can be selectively combined and configured to allow various modifications.

The invention claimed is:

1. A self-learning robot comprising:
a data reception unit configured to receive first data from a camera or a microphone;
a data recognition unit configured to perform recognition of the first data by searching for first behavior information mapped to the first data in a database of the self-learning robot;
a recognition result verification unit configured to determine whether the recognition of the first data has succeeded or failed;
a behavior instruction unit configured to operate according to a first behavior based on the first behavior information when the recognition has succeeded;
a server communication unit configured to transmit an update request signal to a server when the recognition has failed; and
a recognition model updating unit configured to update the database using learning data received from the server in response to the update request signal.

2. The self-learning robot according to claim 1, wherein the recognition result verification unit is further configured to determine that the recognition has failed when the searched first behavior information is plural.

3. The self-learning robot according to claim 1, wherein the recognition result verification unit is further configured to determine that the recognition has failed when another self-learning robot located within a certain area outputs behavior information corresponding to the first data and that is different from the first behavior information.

4. The self-learning robot according to claim 1, further comprising a communication unit configured to transmit the first data to a user equipment and receive second behavior information corresponding to the first data from the user equipment,
wherein the recognition result verification unit is further configured to:
determine that the recognition has succeeded when the first behavior information and the second behavior information are same; and
determine that the recognition has failed when the first behavior information and the second behavior information are different.

5. The self-learning robot according to claim 4, wherein the communication unit is further configured to receive a command for performing a specific object-coping behavior when the recognition has failed.

6. The self-learning robot according to claim 1, wherein the server communication unit is further configured to:
receive at least one behavior information corresponding to the first data as the learning data when the server determines that the database can be updated by using the first data; and
receive second data that is similar to the first data and at least one behavior information corresponding to the second data as the learning data when the server determines that the database cannot be updated using the first data.

7. The self-learning robot according to claim 1, further comprising a data transformation unit configured to transform the first data when transmitting the update request signal to the server.

8. The self-learning robot according to claim 7, wherein the transformed first data comprises:
   image data or audio data related to at least one object that is recognized; and
   environment data including a distance between the at least one recognized object and the self-learning robot and a temperature of the at least one object.

9. A self-learning system comprising:
   a server; and
   a robot configured to:
   perform recognition of first data received from a camera or a microphone by searching for first behavior information mapped to the first data in a database of the robot;
   operate according to a first behavior based on the first behavior information when the recognition has succeeded;
   transmit an update request signal to the server when the recognition has failed; and
   update the database using learning data received from the server in response to the update request signal.

10. The self-learning system according to claim 9, wherein the server determines that information about an object and behavior information related to the object are updated information when update request signals are received from a plurality of self-learning robots within a predetermined time.

11. The self-learning system according to claim 9, wherein the robot is further configured to:
   receive at least one behavior information corresponding to the first data as the learning data when the server determines that the database can be updated using the first data; and
   receive second data that is similar to the first data and at least one behavior information corresponding to the second data as the learning data when the server determines that the database cannot be updated using the first data.

12. A self-learning robot comprising:
   a camera;
   a microphone;
   a database;
   a communication unit; and
   a processor operably coupled with the camera, the microphone, the database, and the communication unit and configured to:
   receive first data from the camera or the microphone;
   perform recognition of the first data by searching for first behavior information mapped to the first data in the database;
   determine whether the recognition of the first data has succeeded or failed;
   operate according to a first behavior based on the first behavior information when the recognition has succeeded;
   cause the communication unit to transmit an update request signal to a server when the recognition has failed; and
   update the database using learning data received from the server in response to the update request signal.

* * * * *